Bostwick's Sheet Metal Cutter

No. 116923

Patented Jul 11 1871

Witnesses
Frank I. Parker
J. E. Conant

Inventor
Seymour A. Bostwick

UNITED STATES PATENT OFFICE.

SEYMOUR A. BOSTWICK, OF WALTHAM, MASSACHUSETTS.

IMPROVEMENT IN MACHINES FOR CUTTING SHEET METAL.

Specification forming part of Letters Patent No. 116,923, dated July 11, 1871.

*To all whom it may concern:*

Be it known that I, SEYMOUR A. BOSTWICK, of Waltham, county of Middlesex and State of Massachusetts, have invented a certain new and useful Improved Sheet-Metal Cutter, of which the following is a specification:

The nature of my invention consists in combining, with a set of revolving cutters, an improved adjusting device, and also a set of adjustable revolving disks, the disks being at right angles with the plane of the cutters, the whole so arranged that sheet-metal disks may be cut circular in form, and of any desired diameter.

Figure 1:
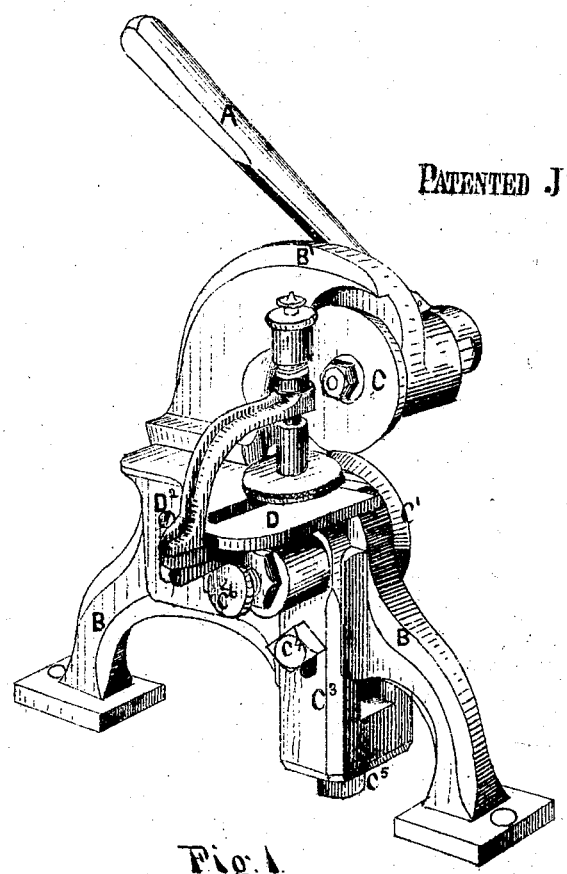
Figure 2:
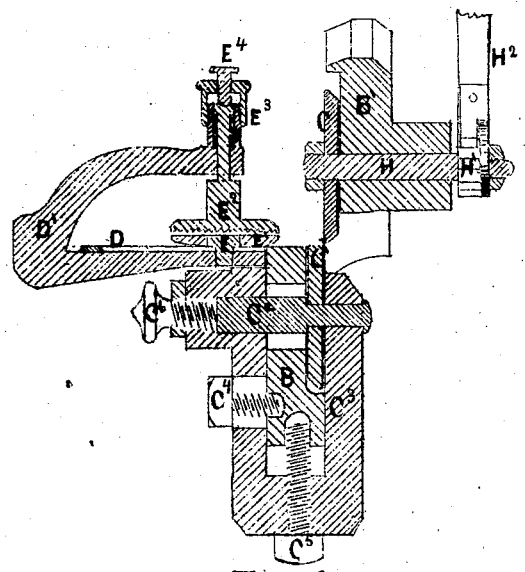

Figure 1 is a perspective view of my invention. Fig. 2 is a vertical section of the same.

I construct my invention as follows: B B' is the frame to which the other parts are attached, and may be constructed in the general form shown in the drawing. C is a circular cutter-wheel made in the ordinary manner, and is fixed to a shaft, H, Fig. 2, so that as the shaft H is made to revolve by the ratchet $H^1$ and lever $H^2$, the cutter itself will revolve, and thus, by friction, carrying the lower cutter $C^1$, and also serve to feed in the plate to be cut. It being necessary to adjust the lower cutter-wheel both vertically and horizontally, it is hung upon a yoke, $C^3$, which may be adjusted laterally by the set-screw $C^4$ and vertically by the screw $C^5$. The spindle $C^2$, upon which the cutter $C^1$ revolves, is made with a shoulder, as shown in Fig. 2, which may be pressed against the cutter $C^1$ by means of the set-screw $C^6$; thus the pressure of the cutter-wheel $C^1$ against the cutter-wheel C may be regulated at pleasure. D is a table, which may be adjusted to any desired position, as it is fastened to the frame $b$ by two screws passing through slots, as shown at $D^2$, Fig. 1. The yoke $D^1$ slides on the table D and carries with it the revolving disks $E^1$ and $E^2$, so that by simply moving the yoke the disks $E^1$ and $E^2$ may be set at any distance from the cutters C and $C^1$. The disks $E^1$ and $E^2$ are free to revolve on their centers, the upper one being so arranged that it may be moved up or down by the spring S and screw $E^4$ so as to leave any required distance between the two disks.

To use my machine I proceed as follows: If I wish to cut any shape other than round the disks, $E^1$ and $E^2$ may be removed or set so far apart as not to interfere with the plate to be cut. Then the plate to be cut may be so placed as to come in contact with the cutters C $C^1$ and the cutter C be caused to revolve; this will cause the plate to be drawn in and cut.

If I wish to cut a circular piece from a plate, I set the disks $E^1$ and $E^2$ so that the distance from the face of the cutter C to the center of the disks will equal the semi-diameter of the piece to be cut, and clamp the plate between the two disks. Then, by revolving the cutters, the plate will be revolved on the center of the disks and be cut into a circular form.

If desirable, the ratchet-lever $H^1$ $H^2$ may be replaced by a crank, and the cutter-wheels C and $C^1$ connected by suitable gears.

I claim as my invention—

1. The combination of the cutter $C^1$, the spindle $C^2$, the yoke $C^3$, the frame B $B^1$, and screws $c^4$ and $c^5$, when the same are arranged substantially as described, and for the purpose set forth.

2. The adjustable tube D, in combination with the yoke $D^1$, disks $E^1$ $E^2$, and frame B, substantially as described, and for the purpose set forth.

SEYMOUR A. BOSTWICK.

Witnesses:
FRANK G. PARKER,
JAS. S. CONANT.